I. SCHWINN.
MOTOR CYCLE FRAME CONSTRUCTION.
APPLICATION FILED MAR. 24, 1915.
Patented Apr. 24, 1917.
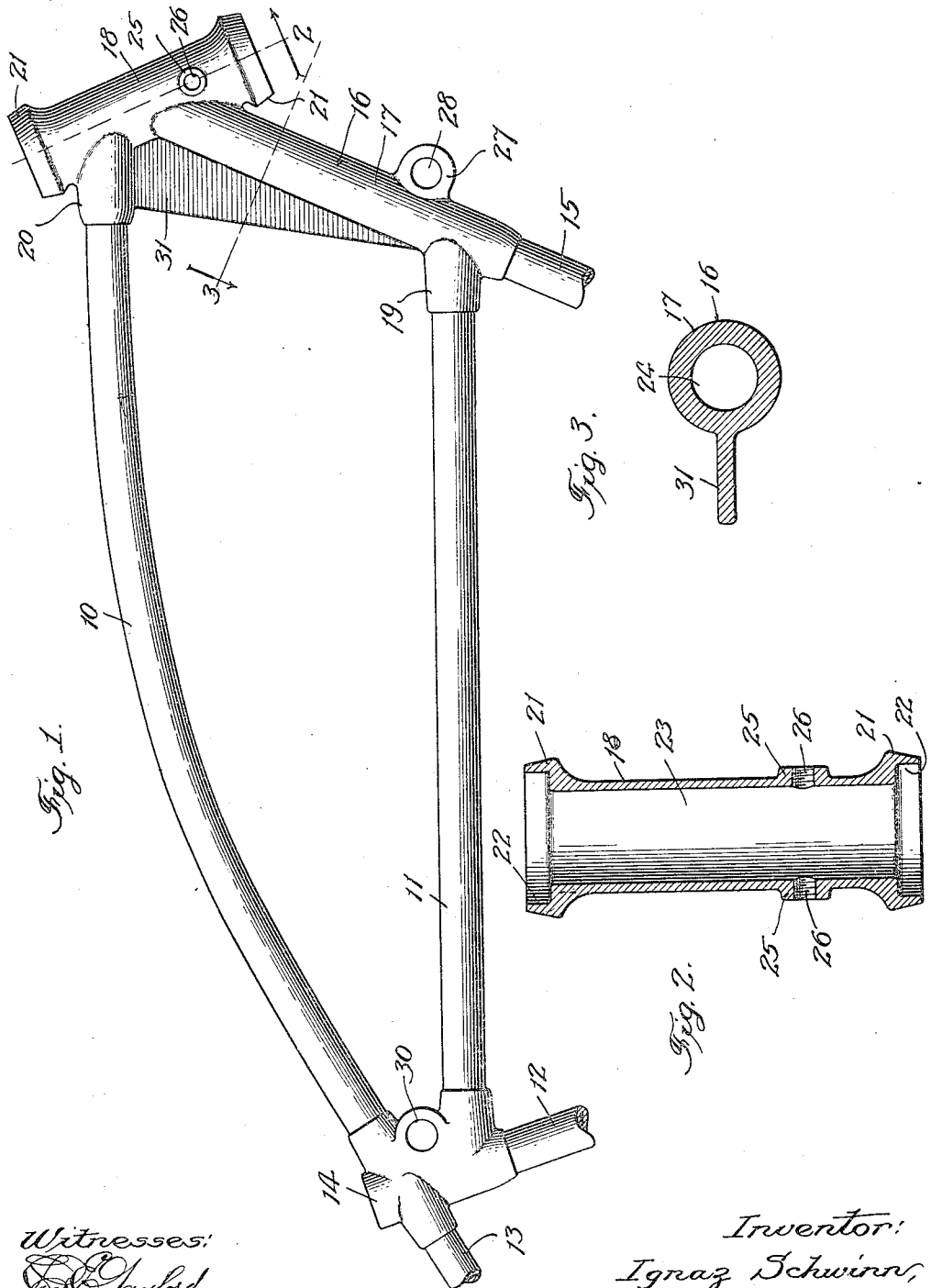
Inventor:
Ignaz Schwinn,
By Dyrenforth, Lee, Chritton and Wiles
Att'ys

UNITED STATES PATENT OFFICE.

IGNAZ SCHWINN, OF CHICAGO, ILLINOIS.

MOTOR-CYCLE-FRAME CONSTRUCTION.

1,223,740.  Specification of Letters Patent.  Patented Apr. 24, 1917.

Application filed March 24, 1915. Serial No. 16,713.

*To all whom it may concern:*

Be it known that I, IGNAZ SCHWINN, a citizen of the United States, residing at Chicago, in the county of Cook and State of Illinois, have invented a new and useful Improvement in Motor-Cycle-Frame Construction, of which the following is a specification.

My invention relates to improvements in motorcycle frames, and more particularly to the construction of the frame-head.

My object is, in general, to provide a simple and exceedingly strong form of head construction. Further objects and advantages of the invention will appear more fully from the following detailed description of one specific embodiment of the same. In this description reference will be had to the accompanying drawings, in which Figure 1 is a side elevation of the upper portion of a motorcycle frame constructed in accordance with my invention; Fig. 2 is an enlarged section on the line 2 of Fig. 1, and Fig. 3 is an enlarged section on the line 3 of Fig. 1.

Referring more particularly to the drawings, 10 designates an upper frame-bar and 11 a lower frame-bar, the two bars being joined together and to the seat-post mast 12 and rear stays 13 by a cluster 14 which receives the ends of the frame-bars.

My invention is more particularly concerned with the manner of joining the bars 10 and 11 to the front frame-bar 15. For this purpose I provide an especially formed head member designated as a whole by the numeral 16. The head member consists essentially of a forwardly and upwardly inclining portion 17, which is in effect an extension of the front frame-bar 15, and a downwardly and forwardly inclining member 18 which forms the head member proper of the motorcycle frame. The section 17 is provided at its lower end with a hollow boss 19 which receives the forward end of the lower frame-bar 11, and the section 18 is provided with a similar boss 20 which receives and secures the front end of the upper frame-bar 10. The section 18, which forms the head proper, is formed with enlarged ends 21 which are counter bored, as at 22, to form seats for bearing members, such as the ordinary annular ball-races, which carry the fork and front wheel of the motorcycle. Both the section 18 and the section 17 are bored throughout their length, as shown in Figs. 2 and 3, the bores being designated, respectively, by the numerals 23 and 24. In the specific form of construction illustrated by the drawing the section 18 is further provided with small laterally extending bosses 25, which may be drilled and tapped, as at 26, to provide convenient means for securing certain portions of the equipment of the motorcycle. In the specific embodiment shown the section 17 is further provided with a boss 27 extending forwardly and having a relatively large aperture 28 therethrough. This boss I design particularly for use in connection with a similarly apertured boss 30 formed in the seat-cluster 14 for the purpose of conveniently fastening to the motorcycle frame relatively heavy structures, such as the side-cars and the like now commonly used in connection with motorcycles.

I have found from experience that motorcycle frames as at present constructed have a considerably lower factor of safety in their head portions and the joints and bar sections immediately adjacent thereto than at any other point. In designing my present frame construction it is therefore one of my primary objects to so construct and arrange the joint members and head connections as to materially increase the strength of all these parts of the frame without departing substantially from what has come to be accepted as a standard truss frame construction. With this in view I form the frame-head 16 as above described, preferably as a single unitary element of the frame construction, including within the unit a bottom cluster for securing the lower frame bar 11 to the front frame bar 15, and section 17 which forms in effect a projection or extension of the front frame bar 15, and a head section 18 which forms a cluster providing a pivot-bearing for the fork and a securing means for the upper frame bar 10 and section 17 which, as before stated, replaces the upper end of the front frame bar 15. For the purpose of additionally strengthening the construction of this unitary head, I prefer to form the latter with a web 31 joining the boss 20 and the head section 18 with the section 17 and extending downwardly along the latter to the boss 19.

In constructing my unitary head I prefer to form the latter as a drop forging, this method of manufacture insuring in so far as possible a homogeneous and reliable metal.

When so formed the whole structure will of course be solid throughout, and the sections 17 and 18, as well as the bosses 19 and 20, must be bored to bring the head to the finished shape. It is recognized that other methods of manufacture might be employed, however, such as casting or autogenous welding. My invention is not concerned with the particular method of manufacture of this head portion but with the design of the same by which the head forms a single unitary structure which may be regarded as a rigid unbreakable unit in calculating the stresses within the frame bars 10, 11 and 15.

While I have shown and described in considerable detail one embodiment of my invention, it is to be understood that such showing and description is illustrative only and for the purpose of making my invention more clear, and that I do not regard my invention as limited to the specific features of construction shown or described, nor to any of them, except in so far as I have included such limitation within the terms of the following claims, in which it is my intention to claim all novelty inherent in my invention in as broad a manner as possible in view of the prior art.

What I claim as new and desire to secure by Letters Patent is:

1. In cycle-frame construction, upper and lower frame-bars, a front frame-bar extending at an angle to said bars and terminating short of said lower frame-bar, and a unitary head-section forming an extension of said front frame-bar, as well as a joint member for securing the upper end of said front frame-bar to the front ends of said upper and lower frame-bars and a fork-supporting head-member.

2. In cycle-frame construction, upper and lower frame-bars, a front frame-bar extending at an angle to the said bars and terminating short of said lower frame-bar, and a unitary head-section forming an extension of said front frame-bar, as well as a joint member for securing the upper end of said front frame-bar and the front ends of the said upper and lower frame-bars, and a fork-supporting head-member, said head-section having a web lying within the said frame and joining the securing means for said upper frame-bar, the head-member and the extension of said front frame-bar.

3. In cycle-frame construction a unitary frame element comprising a fork-supporting head-member, a boss for securing an upper frame-bar and a member for securing a lower frame-bar and a front frame-bar.

4. In cycle-frame construction, a unitary frame element comprising a fork-supporting head member having integral counter bored bosses adapted to receive fork-supporting bearings, a boss for securing an upper frame-bar, a member extending at an angle to said head-member, and a cluster carried by the outer end of said member for securing a lower frame-bar and a front frame-bar.

5. In cycle-frame construction, a unitary frame element comprising a fork-supporting head-member, a boss for securing an upper frame member, an extension in the plane of said boss and divergently inclined with relation thereto, a cluster for securing a lower frame-bar and a front frame bar on the outer end of said last-named extension, and a web-section lying within the angle of and joining the said boss, head-member and extension.

IGNAZ SCHWINN.

In presence of—
NELLIE B. DEARBORN,
K. O'NEILL.

Copies of this patent may be obtained for five cents each, by addressing the "Commissioner of Patents, Washington, D. C."